United States Patent
Thomas et al.

(10) Patent No.: US 9,600,310 B2
(45) Date of Patent: Mar. 21, 2017

(54) COMPATIBILITY-BASED CONFIGURATION OF HARDWARE WITH VIRTUALIZATION SOFTWARE

(71) Applicant: Open Invention Network, LLC, Durham, NC (US)

(72) Inventors: Geoffrey G. Thomas, San Francisco, CA (US); John Whaley, Fremont, CA (US); Umesh Agashe, Redwood City, CA (US)

(73) Assignee: Open Invention Network, LLC, Durham, NC (US)

( * ) Notice: Subject to any disclaimer, the term of this patent is extended or adjusted under 35 U.S.C. 154(b) by 143 days.

(21) Appl. No.: 14/145,597

(22) Filed: Dec. 31, 2013

(65) Prior Publication Data

US 2015/0186172 A1 Jul. 2, 2015

(51) Int. Cl.
*G06F 9/445* (2006.01)
*G06F 9/455* (2006.01)
*G06F 9/50* (2006.01)
*G06F 11/36* (2006.01)

(52) U.S. Cl.
CPC ............ *G06F 9/45533* (2013.01); *G06F 8/61* (2013.01); *G06F 9/455* (2013.01); *G06F 9/5044* (2013.01); *G06F 11/36* (2013.01); *G06F 11/3604* (2013.01)

(58) Field of Classification Search
CPC .. G06F 9/455; G06F 9/45533; G06F 9/45541; G06F 9/45579; G06F 8/61; G06F 9/5044; G06F 11/3604; G06F 11/36
See application file for complete search history.

(56) References Cited

U.S. PATENT DOCUMENTS

| | | | | |
|---|---|---|---|---|
| 5,504,922 | A * | 4/1996 | Seki | G06F 9/45533 703/25 |
| 8,176,564 | B2 * | 5/2012 | Frank et al. | 726/27 |
| 8,359,374 | B2 * | 1/2013 | Govil et al. | 709/220 |
| 8,990,639 | B1 * | 3/2015 | Marr | G06F 11/30 714/25 |
| 2006/0107329 | A1 * | 5/2006 | Frank et al. | 726/26 |
| 2006/0294516 | A1 * | 12/2006 | Winner | G06F 9/455 718/1 |
| 2007/0168957 | A1 * | 7/2007 | Li | G06F 11/3604 717/120 |

(Continued)

OTHER PUBLICATIONS

Bozman, J., et al., Optimizing Hardware for x86 Server Virtualization, IDC White Paper, Aug. 2009, 18 pages, [retrieved on Oct. 14, 206], Retrieved from the Internet: <URL:http://www.pentium.co.cr/Assets/PDF/WhitePaper/IDCchoosingvirthardware.pdf>.*

(Continued)

*Primary Examiner* — Geoffrey St Leger
(74) *Attorney, Agent, or Firm* — Haynes and Boone, LLP

(57) ABSTRACT

The disclosed embodiments provide a system that facilitates the use of a computer system with virtualization software. During operation, the system obtains a set of hardware attributes from the computer system and a hardware compatibility list (HCL) for the virtualization software. Next, the system uses the hardware attributes and the HCL to predict a compatibility of a hardware component in the computer system with the virtualization software. The system then uses the predicted compatibility to manage use of the computer system with the virtualization software.

21 Claims, 5 Drawing Sheets

(56) References Cited

U.S. PATENT DOCUMENTS

| | | | |
|---|---|---|---|
| 2008/0104575 A1* | 5/2008 | Fan .................... | G06F 11/36 |
| | | | 717/124 |
| 2009/0083375 A1* | 3/2009 | Chong .................. | G06F 8/61 |
| | | | 709/203 |
| 2011/0060832 A1* | 3/2011 | Govil et al. ............ | 709/225 |
| 2012/0030669 A1* | 2/2012 | Tsirkin ............... | G06F 9/45533 |
| | | | 718/1 |
| 2013/0097597 A1* | 4/2013 | Gibson ................ | G06F 8/61 |
| | | | 717/177 |
| 2014/0298317 A1* | 10/2014 | Devine ................. | 717/174 |
| 2015/0082300 A1* | 3/2015 | Gokhale ............ | G06F 9/45533 |
| | | | 718/1 |
| 2015/0089479 A1* | 3/2015 | Chen .................. | G06F 11/3664 |
| | | | 7/124 |

OTHER PUBLICATIONS

Overview of XenServer HCL, Citrix, Sep. 2010, 7 pages, [retrieved on Oct. 14, 2016], Retrieved from the Internet: <URL:http://support.citrix.com/servlet/KbServlet/download/23095-102-671656/HCL>.*

\* cited by examiner

COMPATIBILITY-BASED CONFIGURATION OF HARDWARE WITH VIRTUALIZATION SOFTWARE

RELATED APPLICATION

The subject matter of this application is related to the subject matter in a co-pending non-provisional application by inventors John Whaley and Thomas Joseph Purtell II, entitled "Interception and Management of I/O Operations on Portable Storage Devices," having Ser. No. 12/435,273 and filing date 4 May 2009.

BACKGROUND

Field

The disclosed embodiments relate to techniques for facilitating the execution of virtualization software on computer systems. More specifically, the disclosed embodiments relate to techniques for configuring hardware on the computer systems based on the compatibility of the hardware with the virtualization software.

Related Art

Virtual machines may be used to extend the functionality and portability of computing environments. For example, a virtual machine containing a guest operating system may be executed from any computer with a compatible hypervisor for the virtual machine. The self-contained nature of the virtual machine may also facilitate the efficient copying and transfer of the virtual machine between multiple devices, including personal computers, servers, and portable storage devices.

Ease of deployment and portability may further be facilitated through the central management and local execution of virtual machines. An example of a central management solution for locally executed virtual machines may include the MokaFive Server, BareMetal Player and Creator products offered by MokaFive (moka5, Inc. a Delaware corporation). In particular, a virtual machine may be centrally defined and managed using the MokaFive Server. Any computer containing the BareMetal Player may then download an image of the virtual machine from the MokaFive Server and run the virtual machine within the BareMetal Player. Changes made to the virtual machine from the computer may be backed up on the MokaFive Server so that subsequent execution of the virtual machine from other computers may include the changes. Similarly, updates to the virtual machine may be administered by the MokaFive Server and automatically included in the virtual machine image so that subsequent use of the virtual machine includes the updates.

However, hypervisors such as the BareMetal Player may be installed on computer systems containing a variety of processors, memory devices, storage devices, peripheral components, and/or other hardware components. In turn, variations in the manufacturers, models, firmware versions, and/or hardware versions of the components may cause some of the components to experience limited and/or no functionality with the hypervisor. To mitigate compatibility issues with the hardware components, tests may be run on the hardware components during installation and/or use of the hypervisor. A database of compatibility reports may also be maintained to facilitate identification of potential hardware compatibility issues with the hypervisor. Any issues found may then be mitigated by updating the hypervisor software and/or performing actions recommended in the compatibility reports.

Consequently, use of hypervisors and/or other virtualization software with hardware components may be facilitated by mechanisms for identifying, diagnosing, and/or resolving compatibility issues between the virtualization software and the hardware components.

SUMMARY

The disclosed embodiments provide a system that facilitates the use of a computer system with virtualization software. During operation, the system obtains a set of hardware attributes from the computer system and a hardware compatibility list (HCL) for the virtualization software. Next, the system uses the hardware attributes and the HCL to predict a compatibility of a hardware component in the computer system with the virtualization software. The system then uses the predicted compatibility to manage use of the computer system with the virtualization software.

In some embodiments, the system also uses the hardware attributes and the HCL to determine a confidence in the predicted compatibility. If the confidence falls below a pre-specified threshold, the system performs one or more tests associated with the virtualization software on the hardware component, and updates the HCL and the compatibility based on one or more results of the one or more tests.

In some embodiments, the HCL is obtained from and updated using at least one of a portable storage device and a server.

In some embodiments, the one or more tests include at least one of an automated test, interaction with a user of the computer system, and execution of a test virtual computing environment on the computer system.

In some embodiments, the confidence is determined based on at least one of an amount of compatibility information for the hardware component in the HCL, and a consistency of the compatibility information.

In some embodiments, using the hardware attributes and the HCL to predict the compatibility of a hardware component with the virtualization software involves matching a subset of the hardware attributes associated with the hardware component to one or more reports in the HCL, and using the one or more reports to predict the compatibility.

In some embodiments, using the predicted compatibility to manage use of the computer system with the virtualization software involves at least one of:
  (i) generating an alert associated with the predicted compatibility;
  (ii) providing a list of compatible hardware to a user of the computer system;
  (iii) modifying an installation of the virtualization software on the computer system;
  (iv) modifying execution of the virtualization software on the computer system; and
  (v) modifying execution of the hardware component.

In some embodiments, the predicted compatibility includes a level of function, a performance, a reliability, a functioning feature, and/or a non-functioning feature.

In some embodiments, the set of hardware attributes includes a name, a hardware class, a manufacturer, a model number, a firmware version, a hardware version, and/or a serial number.

In some embodiments, the compatibility is predicted during at least one of installation of the virtualization software, execution of the virtualization software, updating of the virtualization software, and updating of the hardware component.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
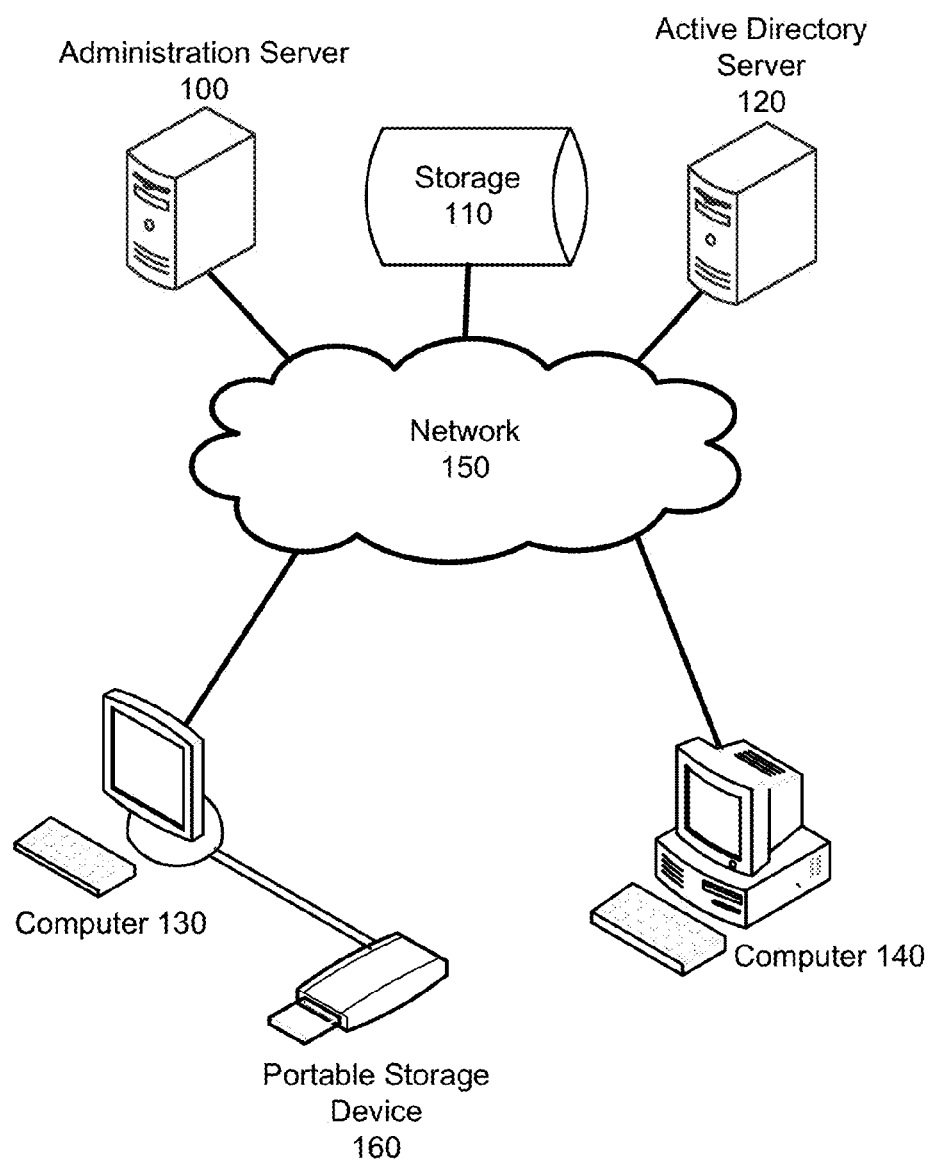
FIG. 1 shows a schematic of a system in accordance with the disclosed embodiments.

FIG. 1 shows a schematic of a system in accordance with an embodiment. As shown in FIG. 1, the system includes an administration server 100, storage 110, an active directory server 120, a set of computers 130-140, a network 150, and a portable storage device 160. Each of the components is described in further detail below.

Computers 130-140 may correspond to electronic devices that are used to perform tasks for users of computers 130-140. For example, each computer 130-140 may be a personal computer (PC), laptop computer, and/or workstation. Network 150 may correspond to a computer network, such as a local area network (LAN), wide area network (WAN), wireless network, intranet, Internet, and/or another type of network that facilitates communication among devices (e.g., administration server 100, storage 110, active directory server 120, computers 130-140) connected to network 150. For example, computers 130-140 may operate as clients in network 150 and allow users of computers 130-140 to send and receive emails, retrieve web pages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux, Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system.

In other words, the execution of one or more virtual computing environments on computers 130-140 may provide increased versatility, utilization of resources, and/or security to computers 130-140. Virtualization software such as VMware Workstation (Windows), VMware Fusion (Mac) (VMware Fusion™ is a registered trademark of VMware, Inc.), Parallels, and VirtualBox (VirtualBox™ is a registered trademark of Oracle America, Inc.) may be used to provide these capabilities.

In one or more embodiments, the system of FIG. 1 enables the central management and local execution of virtual computing environments. Such central management and local execution may allow the virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc., a Delaware corporation). In particular, the MokaFive Player may be used with computers 130-140 to locally execute a centrally defined and managed virtual computing environment according to rules and access controls defined in the MokaFive Server.

Administration server 100 may be a server that supports centralized definition of virtual computing environments and management of access and permissions to the same for local execution. For example, administration server 100 may be provided by the MokaFive Server. Administration server 100 may itself execute in a virtual computing environment, such as a VMware ESX environment. An administrator of virtual computing environments for computers 130-140 may create, configure, and delete the virtual computing environments by interacting with administration server 100 through a management interface (e.g., graphical user interface (GUI), web-based user interface, etc.) provided by administration server 100.

Active directory server 120 may provide network-based directory services. For example, active directory server 120 may be a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies to virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

To access the virtual computing environments, each computer 130-140 may include one or more subscriptions to virtual computing environments stored in storage 110. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user.

Furthermore, virtual computing environments executing on computers 130-140 may be stored on and/or loaded from portable storage devices (e.g., portable storage device 160) coupled to computers 130-140, including Universal Serial Bus (USB) flash drives, flash memory cards, and/or portable computing devices (e.g., mobile phones, portable media players, etc.). Portable storage device 160 may also include virtualization software (e.g., hypervisors), subscription information, user data, and/or other information required to load the virtual computing environments into any compatible computer (e.g., x86 computers) without pre-installation of software on the computer.

In other words, the virtual computing environments and all information and software required to execute the virtual computing environments may be loaded, stored, and managed entirely from portable storage device 160 instead of from computers 130-140 and/or network 150. Management of virtual computing environments from portable storage devices is described in a co-pending non-provisional application 12/435,273 by inventors John Whaley and Thomas Joseph Purtell II and filed on the same day as the instant application entitled "Interception and Management of I/O Operations on Portable Storage Devices," having serial number TO BE ASSIGNED, and filing date May 4,2009 which is incorporated herein by reference.

As mentioned above, the system of FIG. 1 may enable the central management and local execution of virtual computing environments on computers 130-140. For example, the system of FIG. 1 may allow a single image of a virtual computing environment to be obtained from network 150 and/or portable storage device 160 and installed on multiple computer systems (e.g., computers 130-140), thus simplifying the configuration, upgrading, and management of the computer systems.

Figure 2:
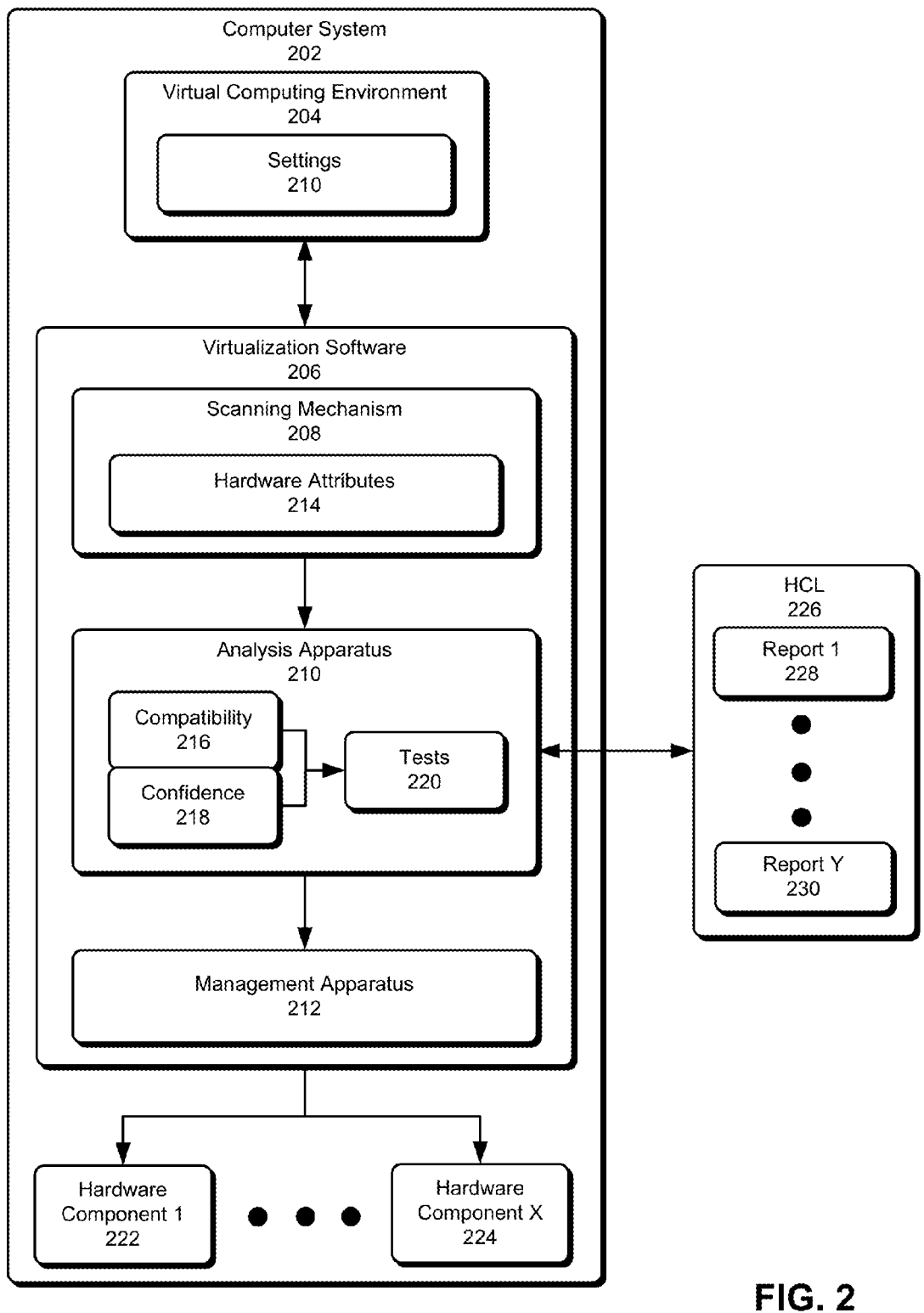
FIG. 2 shows a system for facilitating the use of a computer system with virtualization software in accordance with the disclosed embodiments.

Such centralized, streamlined management of the computer systems may further be enabled by installing virtualization software on the computer systems. As shown in FIG. 2, a computer system 202 (e.g., personal computer, laptop computer, workstation, tablet computer, etc.) may include a virtual computing environment 204 such as a virtual machine. In addition, the use of computer system 202 with virtual computing environment 204 may be enabled by virtualization software 206 such as a hypervisor for the virtual machine. For example, the installation of a MokaFive BareMetal hypervisor on computers 130-140 may enable the installation and execution of the same virtual machine image on computer system 202 and/or other computer systems independently of the make, model, and/or configuration of the computer systems.

On the other hand, virtualization software 206 may not be fully compatible with all available types of hardware. For example, computer system 202 may include a set of hardware components (e.g., hardware component 1 222, hardware component x 224) such as a processor, memory, storage device, input/output (I/O) components, and/or peripheral components. Each hardware component may vary in manufacturer, model, hardware version, firmware version, and/or other hardware attributes 214 that may affect the configuration and/or operation of the component.

Such variations in hardware components may result in limited functionality, performance, and/or reliability of the hardware components during use of the hardware components with virtualization software 206. For example, a hardware component may experience full functionality, reduced functionality, and/or no functionality with virtualization software 206.

In one or more embodiments, the system of FIG. 2 mitigates compatibility issues between virtualization software 206 and hardware components on computer system 202 by predicting a compatibility 216 of each hardware component with virtualization software 206 and subsequently managing and/or configuring the hardware component, virtualization software 206, and/or virtual computing environment 204 based on the predicted compatibility 216. Such prediction of compatibilities and management of hardware components may occur during installation, execution, and/or update of virtualization software 206, virtual computing environment 204, and/or the hardware component on computer system 202. For example, compatibilities of hardware components in computer system 202 may be assessed and used to manage and/or configure the hardware components whenever updates to the hardware and/or software components of computer system 202 are made. As shown in FIG. 2, virtualization software 206 includes a scanning mechanism 206, an analysis apparatus 210, and a management apparatus 212. Each of these components is described in further detail below.

Scanning mechanism 206 may scan the hardware components to obtain hardware attributes 214 for the hardware components. For example, scanning mechanism 206 may obtain, for each hardware component, a name, a hardware class (e.g., processor, memory device, memory array, sound device, network adapter, bus, keyboard, touchpad, display, port, controller, optical drive, etc.), a manufacturer, a model number, a firmware version, a hardware version, and/or a serial number. In other words, scanning mechanism 206 may collect identifying information, capabilities (e.g., processor speeds, number of processor cores, amount of memory, amount of disk space, read/write speeds, bus speeds, etc.), specifications, and/or other parameters associated with the hardware components of computer system 202.

Next, analysis apparatus 210 may use hardware attributes 214 and a hardware compatibility list (HCL) 226 for virtualization software 206 to predict a compatibility 216 of each hardware component with virtualization software 206. As with virtualization software 206 and/or virtual computing environment 204, HCL 226 may be obtained from a portable storage device (e.g., portable storage device 160 of FIG. 1) connected to computer system 202. For example, HCL 226 may be included in data that is used in the "offline" installation of virtualization software 206 and/or virtual computing environment 204 on computer system 202 from the portable storage device.

Alternatively, HCL 226 may be obtained by analysis apparatus 210 using a network connection with a server, such as administration server 100 of FIG. 1 and/or another server associated with the "online" installation, management, and/or use of virtualization software 206 on computer systems. For example, HCL 226 may be obtained from a central database that aggregates reports (e.g., report 1 228, report y 230) from a large number of computer systems on which virtualization software 206 is installed. Each report may be uploaded directly to the central database by the corresponding computer system (e.g., computer system 202), or the report may be transmitted to a local server (e.g., administration server) associated with distributing and/or managing virtualization software 206 on the computer system before the report is propagated to the central database for inclusion in HCL 226.

Each report may include the hardware attributes of one or more hardware components, as well as information related to the compatibility of the hardware component(s) with virtualization software 206. For example, each report may include identifying information (e.g., hardware attributes) for a hardware component and/or the computer system containing the hardware component (e.g., manufacturer, model, etc.). The report may also include the level of function of the hardware component (e.g., full, limited, none), the reliability or performance of the hardware component, and/or lists of functioning and non-functioning features of the hardware component during use with virtualization software 206.

After HCL 226 is obtained, analysis apparatus 210 may match one or more hardware attributes (e.g., hardware attributes 214) associated with the hardware component to one or more reports in HCL 226 and use the report(s) to predict compatibility 216. For example, analysis apparatus 210 may use the hardware component's hardware attributes to obtain reports associated with the same hardware component and/or similar hardware components. Analysis apparatus 210 may analyze the reports to determine patterns and/or trends in the compatibility of the hardware component and/or similar hardware components with virtualization software 206. Analysis apparatus 210 may then predict compatibility 216 based on the patterns and/or trends. As with information in reports associated with the hardware component, compatibility 216 may include predictions of the hardware component's level of function, performance, reliability, functioning features, and/or non-functioning features.

Analysis apparatus 210 may further use hardware attributes 214 and HCL 226 to determine a confidence 218 in the predicted compatibility 216. For example, analysis apparatus 210 may determine confidence 218 based on the amount of compatibility information for the hardware component in HCL 226 and/or the consistency of the compatibility information. A hardware component with multiple consistent reports on the hardware component's compatibility 216 with virtualization software 206 may be associated with a high confidence 218 in compatibility 216, while a hardware component with few reports and/or inconsistent reports on the hardware component's compatibility 216 with virtualization software 206 may be associated with a low confidence 218 in compatibility 216.

If confidence 218 falls below a pre-specified threshold, analysis apparatus 210 may perform one or more tests 220 associated with virtualization software 206 on the hardware component to further assess compatibility 216. For example, analysis apparatus 210 may run an automated test that assesses compatibility 216 based on communication with the hardware component and/or a test that involves interaction with a user of computer system 202 (e.g., verifying the correct operation of I/O devices on computer system 202). Analysis apparatus 210 may also execute a test virtual computing environment (e.g., virtual computing environment 204) on computer system 202 to perform a systemic test of hardware compatibility, in lieu of or in addition to tests of individual hardware components. Conversely, if confidence 218 does not fall below the threshold, analysis apparatus 210 may skip testing of the hardware component to expedite and/or streamline the installation, execution, and/or update of virtualization software 206 and/or virtual computing environment 204 on computer system 202.

Results of tests 220 performed on the hardware component may then be used to update HCL 226 and/or compatibility 216. For example, analysis apparatus 210 may use the results to make a more definitive prediction of compatibility 216 and/or increase confidence 218 in the predicted compatibility 216. Analysis apparatus 210 may also generate one or more reports (e.g., report 1 228, report y 230) containing the test results and upload the report(s) to a local and/or central server for inclusion in HCL 226, if a network connection with the server is available. If the network connection is not available, analysis apparatus 210 may update a cached copy of HCL 226 (e.g., on a portable storage device) with the report(s). The reports may then be transmitted to the server once the network connection is available, either on computer system 202 or on another electronic device with access to the cached copy (e.g., another computer system connected to the portable storage device).

Compatibility 216 may then be used by management apparatus 212 to manage use of computer system 202 with virtualization software 206. First, management apparatus 212 may generate an alert associated with the predicted compatibility 216. For example, management apparatus 212 may notify the user of computer system 202 and/or an administrator associated with setup of virtualization software 206 and/or virtual computing environment 204 on computer system 202 of a likely incompatibility between the hardware component and virtualization software 206.

Second, management apparatus 212 may provide a list of compatible hardware to the user. For example, management apparatus 212 may recommend computer systems and/or individual hardware components that are highly compatible with virtualization software 206 to the user and/or administrator, possibly as alternatives to hardware components in computer system 202 that are not compatible with virtualization software 206.

Finally, management apparatus 212 may modify an installation of virtualization software 206, execution of virtualization software 206, and/or execution of the hardware component on computer system 202. For example, management apparatus 212 may select a version of virtualization software 206 and/or virtual computing environment 204 to install to optimize the use of virtualization software 206 and/or virtual computing environment 204 with computer system 202. Similarly, management apparatus 212 may configure encryption algorithms, storage formats, block alignments, and/or other settings (e.g., settings 210) associated with the hardware component, virtual computing environment 204, and/or virtualization software 206 to facilitate optimal execution of virtual computing environment 204, virtualization software 206, and/or the hardware component. Management apparatus 212 may also modify execution of virtual computing environment 204 and/or virtualization software 206 (e.g., using hibernation instead of sleep) so that potential issues (e.g., not waking up from sleep) identified by analysis apparatus 210 are averted.

Such compatibility-based configuration and management of hardware and/or software components on computer system 202 may facilitate use of computer system 202 with virtualization software 206 and/or mitigate compatibility issues between the hardware components and virtualization software 206. Moreover, the continuous update of a centralized HCL 226 with compatibility information for a variety of hardware components and/or computer systems may enable better predictions of compatibility (e.g., compatibility 216) and allow trends and/or patterns associated with hardware compatibilities to be identified and used in subsequent alerts and/or recommendations.

Figure 3:
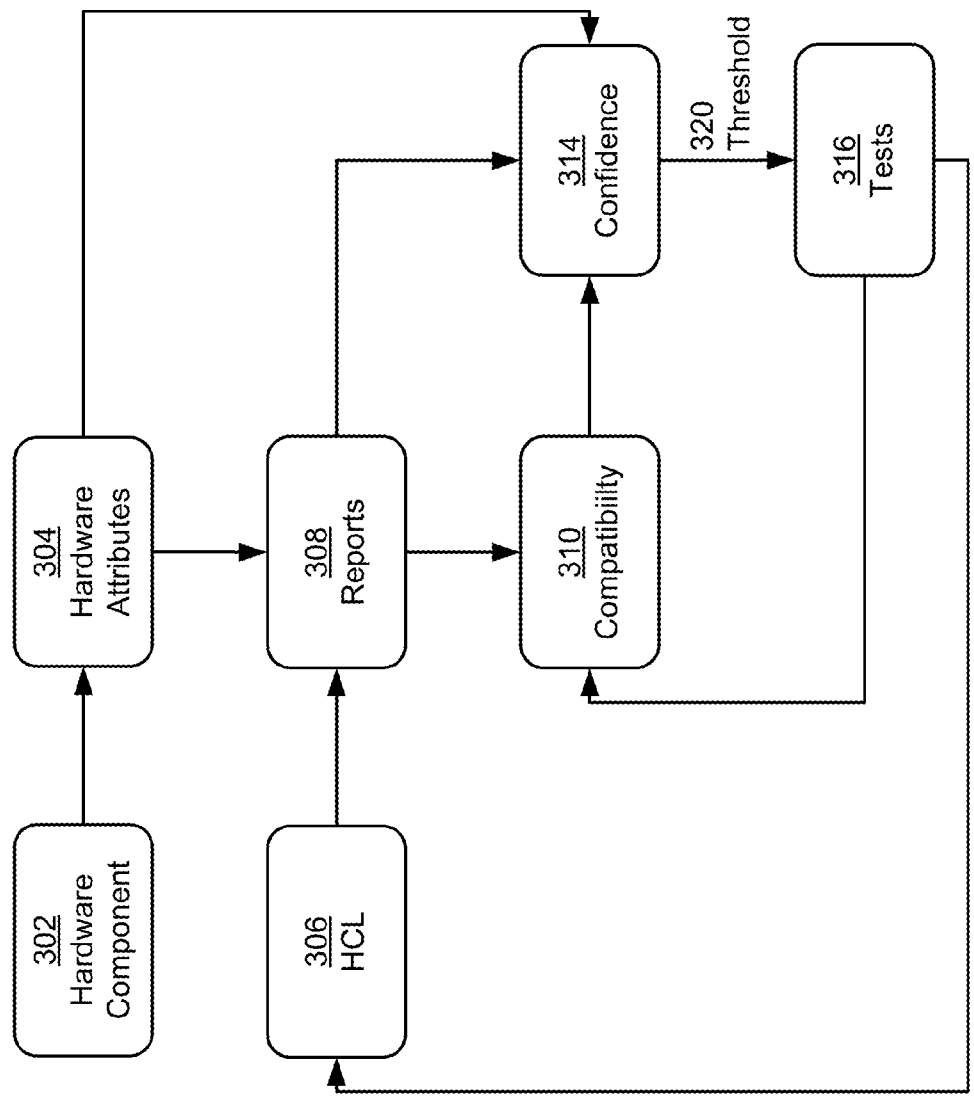
FIG. 3 shows the prediction of a compatibility of a hardware component with virtualization software in accordance with the disclosed embodiments.

FIG. 3 shows the prediction of a compatibility 310 of a hardware component 302 with virtualization software (e.g., virtualization software 206 of FIG. 2) in accordance with the disclosed embodiments. Hardware component 302 may be a processor, memory, motherboard component, bus, port, I/O component, peripheral component, and/or another physical component of a computer system, such as computer system 202 of FIG. 2.

First, a set of hardware attributes 304 is obtained from hardware component 302. For example, a scanning mechanism (e.g., scanning mechanism 208 of FIG. 2) may be used to obtain a name, hardware class, manufacturer, model number, firmware version, hardware version, serial number, and/or other hardware attributes 304 from hardware component 302. Next, hardware attributes 304 may be matched to one or more reports 308 from an HCL 306 for the virtualization software. For example, HCL 306 may be obtained from a portable storage device and/or server associated with the virtualization software. HCL 306 may then be searched for reports 308 of hardware components that match one or more hardware attributes 304 of hardware component 302. Reports that match more hardware attributes 304 may be for hardware components that are the same as and/or highly similar to hardware component 302, while reports that match fewer hardware attributes 304 may be for hardware components that are less similar to hardware component 302.

Compatibility information from reports 308 may then be used to predict compatibility 310. For example, compatibility 310 may include a level of function described using a numeric scale of 0-5, with 5 representing fully functioning and 0 representing completely non-functioning. Compatibility 310 may also include a performance of hardware component 302, which may be expressed in terms of speed, runtime, efficiency, frame rate, and/or benchmarks. Compatibility 310 may further include a prediction of the reliability and/or availability of hardware component 302. Finally, compatibility 310 may include a list of functioning features and/or a list of non-functioning features for hardware component 302.

A confidence 314 in compatibility 310 may also be determined using hardware attributes 304 and reports 308. For example, confidence 314 may be based on the amount of compatibility information for hardware component 302 in HCL 306 and/or a consistency of the compatibility information. A large amount of compatibility information (e.g., from multiple reports 308) that is largely consistent may result in a higher confidence 314, while a small amount of compatibility information and/or mostly inconsistent compatibility information may lead to a lower confidence 314.

After confidence 314 is obtained, confidence 314 may be compared to a pre-specified threshold 320, such as a numeric threshold and/or percentage threshold. If confidence 314 exceeds threshold 320, the current assessment of compatibility 310 may be used to manage and/or configure hardware component 302, the virtualization software, and/or other components of the computer system.

On the other hand, if confidence 314 falls below threshold 320, one or more tests 316 may be performed on hardware component 302, and HCL 306 and compatibility 310 may be updated with results of tests 316. For example, tests 316 may include automated tests, tests that involve interaction with a user of the computer system, and/or system-wide tests that involve executing a test virtual computing environment (e.g., a virtual machine) on the computer system. Results of tests 316 may thus be obtained from data collected during tests 316 and/or user input during tests 316. The results may then be used to confirm compatibility 310 and/or update one or more parameters of compatibility 310 (e.g., level of function, performance, reliability, functioning features, non-functioning features). The results may also be included in HCL 306 to facilitate subsequent predictions of compatibility 310 for the same hardware component 302 and/or similar hardware components.

Finally, compatibility 310 may be used to configure and/or manage hardware component 302, the virtualization software, a virtual computing environment executing using the virtualization software, and/or other hardware or software components of the computer system. For example, compatibility 310 and/or compatibilities of other hardware components with the virtualization software may be used to generate alerts associated with the compatibilities, provide a list of compatible hardware to the user, modify an installation of the virtualization software on the computer system, modify execution of the virtualization software on the computer system, and/or modify execution of the hardware component(s).

Figure 4:
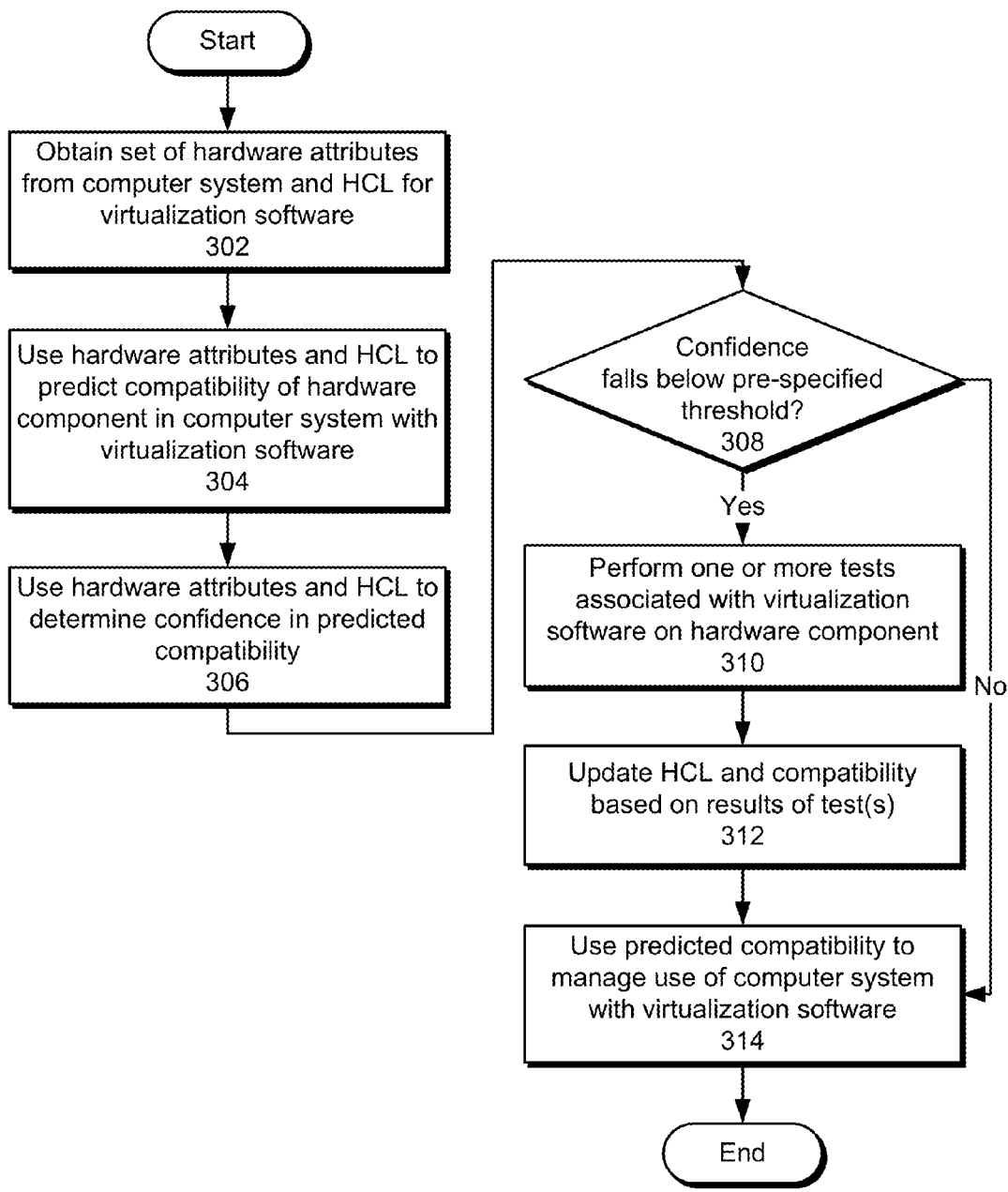
FIG. 4 shows a flowchart illustrating the process of facilitating the use of a computer system with virtualization software in accordance with the disclosed embodiments.

FIG. 4 shows a flowchart illustrating the process of facilitating the use of a computer system with virtualization software in accordance with the disclosed embodiments. In one or more embodiments, one or more of the steps may be omitted, repeated, and/or performed in a different order.

Accordingly, the specific arrangement of steps shown in FIG. 4 should not be construed as limiting the scope of the technique.

Initially, a set of hardware attributes is obtained from the computer system, along with an HCL for the virtualization software (operation 302). The hardware attributes may include a name, a hardware class, a manufacturer, a model, a firmware version, a hardware version, and/or a serial number. The HCL may be provided by a portable storage device from which the virtualization software is loaded and/or a server that is accessed over a network connection by the computer system.

Next, the hardware attributes and HCL are used to predict a compatibility of a hardware component in the computer system with the virtualization software (operation 304) and determine a confidence in the predicted compatibility (operation 306). For example, a subset of the hardware attributes associated with the hardware component may be matched to one or more reports in the HCL, and the report(s) may be used to predict the compatibility. Similarly, the confidence may be based on the amount of compatibility information for the hardware component in the report(s) and/or the consistency of the compatibility information.

The confidence may fall below a pre-specified threshold (operation 308) such as a numeric threshold and/or a percentage threshold. If the confidence falls below the threshold, one or more tests associated with the virtualization software are performed on the hardware component (operation 310). The tests may include an automated test, interaction with a user of the computer system, and/or execution of a test virtual computing environment on the computer system. The HCL and compatibility are also updated based on results of the test(s) (operation 312). For example, the test results may be included in the HCL to increase the amount of compatibility information for the hardware component in the HCL and facilitate subsequent predictions of compatibility for the hardware component and/or similar hardware components (e.g., hardware components with the same hardware class and manufacturer). If the confidence does not fall below the threshold, testing of the hardware component may be omitted.

Finally, the predicted compatibility is used to manage use of the computer system with the virtualization software (operation 314). For example, the compatibility and/or compatibilities of other hardware components with the virtualization software may be used to generate alerts (e.g., of potential incompatibilities) and/or provide a list of compatible hardware to the user. The compatibilities may also be used to modify the installation of the virtualization software (e.g., for optimal use with the hardware component(s)), execution of the virtualization software (e.g., to provide workarounds for identified compatibility issues), and/or execution of the hardware component(s) (e.g., to improve the performance and/or reliability of the hardware component(s)).

Figure 5:
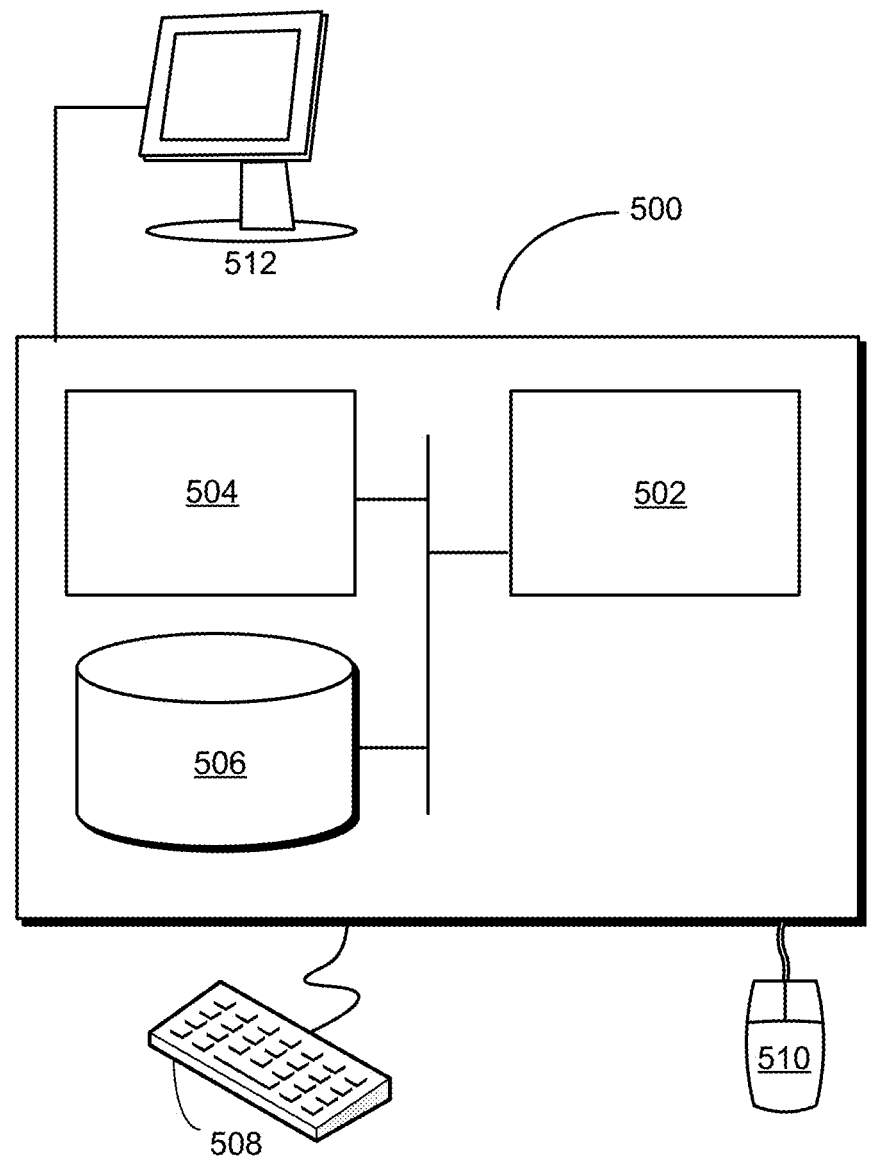
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the use of a computer system with virtualization software. The system may include a scanning mechanism that obtains a set of hardware attributes from the computer system. The system may also include an analysis apparatus that uses the hardware attributes and an HCL for the virtualization software to predict a compatibility of a hardware component in the computer system with the virtualization software. Finally, the system may include a management apparatus that uses the predicted compatibility to manage use of the computer system with the virtualization software.

In addition, one or more components of computer system 500 may be remotely located and connected to the other components over a network. Portions of the present embodiments (e.g., scanning mechanism, analysis apparatus, management apparatus, etc.) may also be located on different nodes of a distributed system that implements the embodiments. For example, the present embodiments may be implemented using a cloud computing system that manages and configures the use of hardware components with virtualization software on a set of remote computer systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the use of a computer system with virtualization software, comprising:
    obtaining a set of hardware attributes from the computer system and a hardware compatibility list (HCL) for the virtualization software;
    using the hardware attributes and the HCL to predict a compatibility of a hardware component in the computer system with the virtualization software and a confidence in said predicted compatibility;
    performing one or more tests associated with the virtualization software on the hardware component if the confidence falls below a pre-specified threshold; and
    using the predicted compatibility, said confidence in said predicted compatibility and a result of said one or more tests to manage use of the computer system with the virtualization software;
    wherein the one or more tests comprise execution of a test virtual computing environment on the computer system.

2. The computer-implemented method of claim 1, further comprising:
    updating the HCL and the compatibility based on one or more results of the one or more tests.

3. The computer-implemented method of claim 2, wherein the HCL is obtained from and updated using at least one of:
   a portable storage device; and
   a server.

4. The computer-implemented method of claim 2, wherein the one or more tests comprise at least one of:
   an automated test; and
   interaction with a user of the computer system.

5. The computer-implemented method of claim 2, wherein the confidence is determined based on at least one of:
   an amount of compatibility information for the hardware component in the HCL; and
   a consistency of the compatibility information.

6. The computer-implemented method of claim 1, wherein using the hardware attributes and the HCL to predict the compatibility of a hardware component with the virtualization software involves:
   matching a subset of the hardware attributes associated with the hardware component to one or more reports in the HCL; and
   using the one or more reports to predict the compatibility.

7. The computer-implemented method of claim 1, wherein using the predicted compatibility to manage use of the computer system with the virtualization software involves at least one of:
   generating an alert associated with the predicted compatibility;
   providing a list of compatible hardware to a user of the computer system;
   modifying an installation of the virtualization software on the computer system;
   modifying execution of the virtualization software on the computer system; and
   modifying execution of the hardware component.

8. The computer-implemented method of claim 1, wherein the predicted compatibility comprises at least one of:
   a level of function;
   a performance;
   a reliability;
   a functioning feature; and
   a non-functioning feature.

9. The computer-implemented method of claim 1, wherein the set of hardware attributes comprises at least one of:
   a name;
   a hardware class;
   a manufacturer;
   a model number;
   a firmware version;
   a hardware version; and
   a serial number.

10. The computer-implemented method of claim 1, wherein the compatibility is predicted during at least one of:
    installation of the virtualization software;
    execution of the virtualization software;
    updating of the virtualization software; and
    updating of the hardware component.

11. A system for facilitating the use of a computer system comprising at least one processor with virtualization software, the system comprising:
    a scanning mechanism stored in at least one memory configured to obtain a set of hardware attributes from the computer system, wherein the at least one processor and at least one memory are communicably coupled;
    an analysis apparatus executed by the at least one processor configured to use the hardware attributes and a hardware compatibility list (HCL) for the virtualization software to predict a compatibility of a hardware component in the computer system with the virtualization software and a confidence in said predicted compatibility and to perform one or more tests associated with the virtualization software on the hardware component if the confidence falls below a pre-specified threshold; and
    a management apparatus executed by the at least one processor configured to use the predicted compatibility, said confidence in said predicted compatibility and a result of said one or more tests to manage use of the computer system with the virtualization software;
    wherein the one or more tests comprise execution of a test virtual computing environment on the computer system.

12. The system of claim 11, wherein the analysis apparatus executed by the at least one processor is further configured to:
    update the HCL and the compatibility based on one or more results of the one or more tests.

13. The system of claim 12, wherein the one or more tests executed by the at least one processor comprise at least one of:
    an automated test; and
    interaction with a user of the computer system.

14. The system of claim 12, wherein the confidence is determined executed by the at least one processor based on at least one of:
    an amount of compatibility information for the hardware component in the HCL; and
    a consistency of the compatibility information.

15. The system of claim 11, wherein using the hardware attributes and the HCL to predict the compatibility of a hardware component with the virtualization software involves:
    matching executed by the at least one processor a subset of the hardware attributes associated with the hardware component to one or more reports in the HCL; and
    using executed by the at least one processor the one or more reports to predict the compatibility.

16. The system of claim 11, wherein using the predicted compatibility to manage use of the computer system with the virtualization software involves at least one of:
    generating executed by the at least one processor an alert associated with the predicted compatibility;
    providing executed by the at least one processor a list of compatible hardware to a user of the computer system;
    modifying executed by the at least one processor an installation of the virtualization software on the computer system;
    modifying execution by the at least one processor of the virtualization software on the computer system; and
    modifying execution by the at least one processor of the hardware component.

17. A non-transitory computer-readable storage medium storing instructions that when executed by a computer cause the computer to perform a method for facilitating the use of a computer system with virtualization software, the method comprising:
    obtaining a set of hardware attributes from the computer system and a hardware compatibility list (HCL) for the virtualization software;
    using the hardware attributes and the HCL to predict a compatibility and a confidence in said predicted compatibility of a hardware component in the computer system with the virtualization software;

performing one or more tests associated with the virtualization software on the hardware component if the confidence falls below a pre-specified threshold; and using the predicted compatibility, said confidence in said predicted compatibility and a result of said one or more tests to manage use of the computer system with the virtualization software;

wherein the one or more tests comprise execution of a test virtual computing environment on the computer system.

18. The computer-readable storage medium of claim 17, the method further comprising:

updating the HCL and the compatibility based on one or more results of the one or more tests.

19. The computer-readable storage medium of claim 18, wherein the confidence is determined based on at least one of:

an amount of compatibility information for the hardware component in the HCL; and a consistency of the compatibility information.

20. The computer-readable storage medium of claim 17, wherein using the hardware attributes and the HCL to predict the compatibility of a hardware component with the virtualization software involves:

matching a subset of the hardware attributes associated with the hardware component to one or more reports in the HCL; and using the one or more reports to predict the compatibility.

21. The computer-readable storage medium of claim 17, wherein using the predicted compatibility to manage use of the computer system with the virtualization software involves at least one of:

generating an alert associated with the predicted compatibility;

providing a list of compatible hardware to a user of the computer system;

modifying an installation of the virtualization software on the computer system;

modifying execution of the virtualization software on the computer system; and modifying execution of the hardware component.

\* \* \* \* \*